Figure 1:
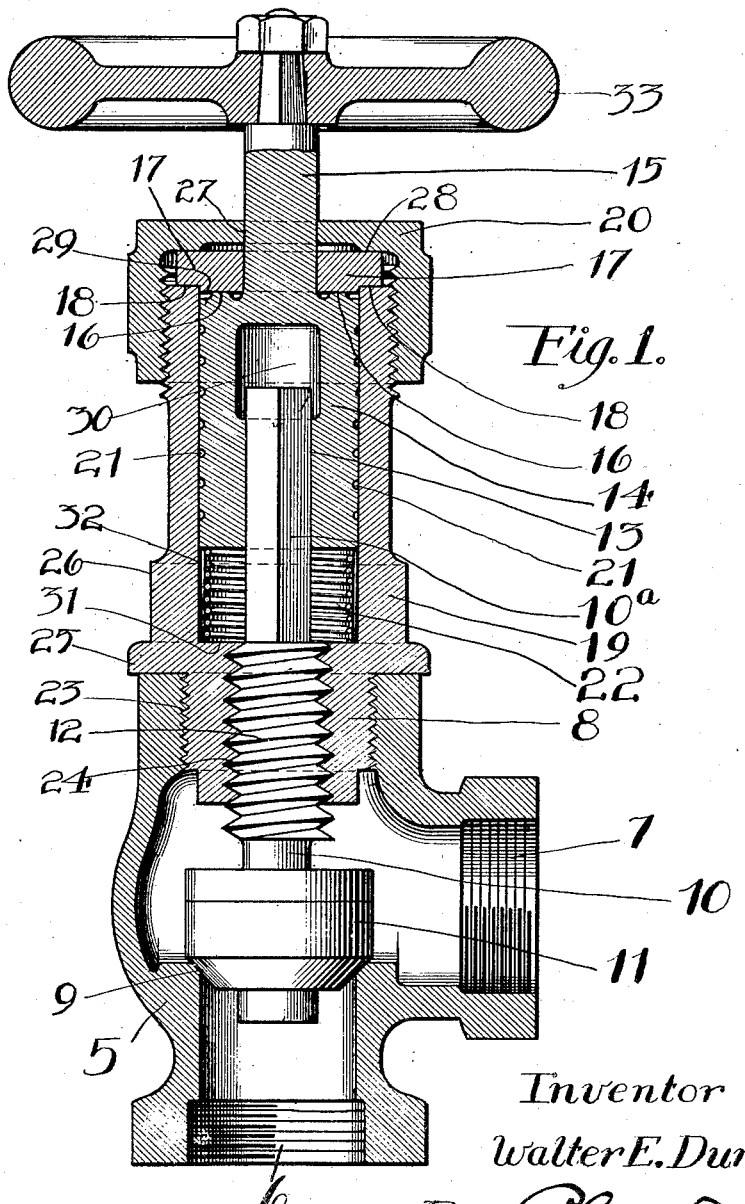

W. E. DUNHAM.
PACKLESS COCK OR VALVE.
APPLICATION FILED APR. 14, 1920.

1,362,986.

Patented Dec. 21, 1920.

Inventor
Walter E. Dunham
By Chas. F. Tillman
Atty.

Witness
Geo. L. Lawrence

UNITED STATES PATENT OFFICE.

WALTER E. DUNHAM, OF CHICAGO, ILLINOIS.

PACKLESS COCK OR VALVE.

1,362,986.  Specification of Letters Patent.  Patented Dec. 21, 1920.

Application filed April 14, 1920. Serial No. 373,701.

*To all whom it may concern:*

Be it known that I, WALTER E. DUNHAM, a citizen of the United States, residing at Chicago, in the county of Cook and State of Illinois, have invented certain new and useful Improvements in Packless Cocks or Valves, of which the following is a specification.

This invention relates to cocks or valves for conduits or pipes employed in pressure systems, and while it is more especially intended for use in the steam pipes leading from a supply of steam or the turrets or domes of locomotives, to points where the same is made to do its work, yet, it is applicable to valves adapted for general use, as in connection with gas, steam, water, and other fittings for fluids under pressure, and it consists in certain peculiarities of the construction, novel arrangement, combination and operation of its parts as will be hereinafter more fully set forth and specifically claimed.

The principal object of the invention is to provide a cock or valve which shall be simple and inexpensive in construction, strong, durable and efficient in operation, with its parts so made, arranged and cooperating with one another as to produce, without ordinary packing, a permanently non-leakable valve, or in other words, to provide a packless cock or valve which shall be fluid tight.

Other objects and advantages of the invention will be disclosed in the following description and explanation.

In the accompanying drawing, the figure is a central vertical sectional view of a cock or valve embodying the invention showing the valve head of the device in its seated or closed position.

Referring to the drawing in detail, the reference numeral 5 designates the valve casing or body which has two openings 6 and 7 for the reception of pipes or conduits, not shown, which may be connected one to a supply of steam or fluid under pressure, and the other to the part to be operated.

The casing at the inner end of the opening 6 is provided with a downwardly inclined or beveled seat 9 for the valve head 11 which is provided with a valve stem 10 the portion of which located adjacent to the valve head being provided with coarse screw-threads 12 for the quick adjustment of said member. The upper portion of the valve stem 10 is by preference angular in cross-section as shown at 10ª to fit in and engage a correspondingly shaped and longitudinally extended opening 13 with which the cylindrical body 14 of the operating stem 15 is provided. This latter stem may have suitably secured on its upper end a hand wheel for turning said stem and its body in the proper direction.

That portion of the body or casing 5 opposite the opening 6 therein is provided with a screw-threaded opening 23 into which is fitted the lower portion 8 of the bonnet or sleeve 19 which is provided in its lower portion with a longitudinally extended and screw-threaded opening 24 for the reception and operation of the screw-threaded section 12 of the valve stem. The bonnet or sleeve 19 is provided with an annular flange 25 to rest on the outer portion of that part of the casing 6 through which the opening 23 is extended and by preference is provided externally just above said flange with a hexagonal contour 26 for ready engagement with a wrench used in tightening the bonnet or sleeve within the valve casing.

As shown, the upper end of the bonnet or sleeve 19 is externally screw-threaded and has in threaded engagement therewith a cap 20 which is centrally provided with an opening 27 for the reception of the operating stem 15 of the device. Located within the cavity of the cap 20 and closely surrounding the stem 15 is a washer 17 which rests at its upper or outer surface closely against the transverse wall 28 of the cap 20. This washer is by preference provided on its lower surface with an annular recess 18 which has at its inner portion a shoulder 29 to rest against the inner surface of the upper portion of the bonnet or sleeve 19 the top or uppermost part of which sleeve rests closely against the horizontal portion of the recess 18. The positions above named of the different parts will be those which are permanently occupied by the cap washer and bonnet when the latter is properly fitted or adjusted to the valve casing.

The cylindrical portion 14 of the operating stem 15 is provided in its peripheary with a series of spaced apart and circumferentially disposed grooves 21 which will provide a water or liquid seal between the rotary body portion 14 of the operating stem 15 and the cylindrical portion of the bonnet in which the said body portion is snugly fitted. As shown, the upper end of the body portion 14 of the operating stem is provided with an annular rib or upwardly extended projection 16 which lies in close contact with the lower surface of the washer 17 and has its upper or outer portion flat for the purpose of producing as close a joint as possible between said rib and the lower surface of the washer. The upper end of the opening 13 in the rotatable body 14 of the operating stem is enlarged as at 30 and will afford space for the movement of the portion 10ᵃ of the valve stem when required.

The lower end of the body 14 of the operating stem terminates, as shown, at some distance above the bottom 31 of the cavity of the bonnet, thus providing a space or chamber 32 between said parts in which is located a coiled spring 22 which rests at one of its ends against the bottom 31 of the cavity of the bonnet and at its other end against the lower end of the body 14 of the operating stem which body will be normally held by the tension of said spring in its upper or outward position as shown, to the end that the annular rib or projection 16 will be tightly or closely pressed against the lower surface of the washer 17 at all times.

From the foregoing and by reference to the drawing it will be readily understood and clearly seen that the valve head 11 may be raised from its seated position or adjusted with respect thereto by turning the hand wheel 33 in the proper direction, in which operation it is apparent that the operating stem 15 and its body 14, as well as the valve stem 10, will be turned in the same direction as said wheel. As the body 14 of the operating stem 15 is provided in its periphery with the water seal grooves 21 and as the upper end of said body is provided with the annular rib or projection 16 which is constantly held in contact with the washer 17 and the latter in constant contact with the portion 28 of the cap 20 by reason of the tension of the spring 22, it is evident that condensation will collect and remain in the grooves 21 and that the connections between the parts 16, 17 and 28 will be such as to absolutely prevent leakage or the escape of fluids.

Furthermore, as the upper end of the bonnet 19 fits closely in the recess 18 and against the wall 29 thereof, it is apparent that an additional seal for the prevention of leakage will be afforded.

Having thus fully described my invention, what I claim as new and desire to secure by Letters Patent is—

1. In a packless cock, the combination with a casing having an inlet and an outlet port and provided with an opening opposed to one of said ports, the last mentioned port having at its inner end a valve seat, of a bonnet threaded to the casing and having a longitudinally extended screw-threaded opening in alinement with said opening having the valve seat and provided at its opposite end with external screw threads, a valved stem adjustably located in said opening of the bonnet and having a cross-sectionally angular portion upwardly from the last named opening, an operating stem having a cylindrical enlargement rotatably located in the upper portion of the bonnet, said enlargement having on its upper end an annular rib or projection and in its periphery a plurality of spaced apart circumferentially disposed grooves and in its lower end an angular opening, a washer surrounding the reduced portion of the operating stem and resting on said rib of the enlargement thereof, said washer having on its lower surface at its periphery an angular annular recess engaging the upper end and inner wall of the bonnet, a cap surrounding said washer and the reduced portion of the operating stem and threaded to the bonnet, and a spring interposed between the lower end of the operating stem and the floor of the cavity of the bonnet.

2. A packless cock including in combination a tubular bonnet secured to a valve casing and having at its outer end external screw threads, an operating stem rotatably mounted in the outer portion of the cavity of the bonnet and having a reduced portion extended from said outer end, the outer end of the enlarged portion of said stem having an annular rib or projection, a washer surrounding the reduced portion of said stem and having on its inner surface at its periphery an angular annular recess receiving the outer end of the bonnet, and a cap surrounding the reduced portion of said stem and the washer and screw-threaded to the bonnet and adapted to clamp the washer in contact with the outer end of the bonnet and the outer portion of said rib.

3. A packless cock including in combination a tubular bonnet having means to secure it to a valve casing and having at its outer end external screw-threads, an operating stem rotatably mounted in the outer portion of the cavity of the bonnet and having a reduced portion extended from said outer portion, the enlarged portion of said stem having in its periphery a plurality of spaced apart circumferentially disposed grooves and on its outer end an annular rib or projection, a washer surrounding the reduced portion of said stem and having on its inner surface at its periphery an annular recess receiving the outer end of the bonnet, and a cap surrounding the reduced portion of said stem and the washer and screw-threaded to the bonnet and adapted to clamp the washer in contact with the outer end of the bonnet and the outer portion of said rib.

4. A packless cock including in combination a tubular bonnet having means to secure it to a valve casing and provided at its outer end with external screw-threads, an operating stem having a cylindrical enlargement rotatably mounted in the outer portion of the cavity of the bonnet and having a reduced portion extended from its outer end, said enlarged portion of said stem having at its outer end an annular rib or projection, means coöperating with the wall of the enlargement and the inner surface of the wall of the bonnet to form a liquid seal, a washer surrounding the reduced portion of said stem and located on the said rib, and a cap surrounding the reduced portion of said stem and the washer and screw-threaded to the bonnet and adapted to clamp the washer in contact with the outer portion of said rib.

WALTER E. DUNHAM.